United States Patent
Katsumi et al.

(10) Patent No.: US 7,708,051 B2
(45) Date of Patent: May 4, 2010

(54) METHOD FOR MANUFACTURE OF A PHYSICAL QUANTITY DETECTOR

(75) Inventors: Tetsuya Katsumi, Kurobe (JP); Hitoshi Ofune, Kurobe (JP); Tadashi Yamaguchi, Kurobe (JP); Hiroshi Nagasaka, Tokyo (JP); Naoki Yoshida, Tokyo (JP)

(73) Assignees: YKK Corporation, Tokyo (JP); Nagano Keiki Co., Ltd., Tokyo (JP)

( * ) Notice: Subject to any disclaimer, the term of this patent is extended or adjusted under 35 U.S.C. 154(b) by 416 days.

(21) Appl. No.: 11/657,162

(22) Filed: Jan. 24, 2007

(65) Prior Publication Data

US 2007/0181222 A1   Aug. 9, 2007

(30) Foreign Application Priority Data

Jan. 25, 2006   (JP)   .............................. 2006-016093

(51) Int. Cl.
  *B22D 17/00*   (2006.01)
  *B22D 33/04*   (2006.01)
(52) U.S. Cl. ...................................... 164/113; 164/137
(58) Field of Classification Search ................. 164/113, 164/312, 137, 342
  See application file for complete search history.

(56) References Cited

U.S. PATENT DOCUMENTS

| | | | | |
|---|---|---|---|---|
| 6,044,893 | A | * | 4/2000 | Taniguchi et al. .......... 164/70.1 |
| 6,189,600 | B1 | | 2/2001 | Taniguchi et al. | |
| 2002/0100573 | A1 | | 8/2002 | Inoue et al. | |
| 2003/0068136 | A1 | | 4/2003 | Kobayashi et al. | |

FOREIGN PATENT DOCUMENTS

| | | |
|---|---|---|
| EP | 0 878 723 A2 | 11/1998 |
| JP | 7132358 | 5/1995 |
| JP | 11267790 | 5/1999 |
| JP | 2000210756 | 8/2000 |
| JP | 2000326065 A | 11/2000 |
| JP | 2004-45048 A * | 2/2004 |
| JP | 2004045048 | 2/2004 |
| WO | WO2005/115653 | 12/2005 |

OTHER PUBLICATIONS

European Search Report dated Nov. 26, 2008 for corresponding European Patent Application No. 07001525.0.

* cited by examiner

*Primary Examiner*—Kevin P Kerns
(74) *Attorney, Agent, or Firm*—Alston & Bird, LLP

(57) ABSTRACT

A physical quantity detector, such as a pressure sensor and a load sensor, includes a cylindrical part of which one end is closed with a strain generating part and a sensor part formed on the strain generating part. The cylindrical part is produced by melting an alloying material having a composition capable of yielding an amorphous alloy, injecting the resultant molten alloy into a metal mold, and cooling the molten alloy in the metal mold to confer amorphousness on the alloy. The metal mold includes a split mold having at least two split parts for forming a cavity and an insert pin to be inserted into the cavity so as to define the inner configuration of the cylindrical part, or further an insert core to be inserted into the mold so as to form the surface of the cavity corresponding to the surface of the strain generating part.

4 Claims, 4 Drawing Sheets

METHOD FOR MANUFACTURE OF A PHYSICAL QUANTITY DETECTOR

BACKGROUND OF THE INVENTION

1. Field of the Invention

This invention relates to a method for the manufacture of a physical quantity detector for measuring fluid pressure, a load and the like.

2. Description of the Prior Art

A pressure sensor, for example, which is a typical example of a physical quantity detector is equipped with a sensor member having a cylindrical part of which one end is closed with a strain generating part and adapted to use the strain generating part as a diaphragm.

This pressure sensor is manufactured by the following steps, as disclosed in JP 2004-45048A, for example.

First, a sensor member 1 is manufactured by machining or forging a metallic material, as shown in FIG. 1, and the surface 3a of a strain generating part (diaphragm) 3 of a cylindrical part 2 thereof is planished by polishing. An insulating film 5 of $SiO_2$ etc. is formed on the polished surface 3a of the strain generating part (diaphragm) 3 by a CVD process or a sputtering process. Thereafter, a thin film of a metal or semi-conductor is formed on the insulating film 5 by a CVD process or a sputtering process and the formed film is etched to a predetermined pattern by means of a photolithographic technique to form a strain gauge 6 formed from the thin film of the metal or semi-conductor. Then, the electrodes 7 of gold, aluminum, etc. for connecting circuits thereto are formed on the strain gauge 6. Further, to finish it as a physical quantity detector, such as a pressure sensor and a load sensor, a protective coat 8, such as SiN, for protecting the strain gauge 6 from steam etc. is formed thereon to form a sensor part 4.

The pressure sensor manufactured in this manner is installed in a desired pressure detecting site by fixedly securing the cylindrical part 2 of the sensor member 1 to a pipe or the like. The fluid, such as gas and liquid, flowing over the pressure detecting site is introduced into the sensor member 1 through a bore 2a of the cylindrical part 2 serving as an introducing hole and reaches to the back surface of the strain generating part (diaphragm) 3. When the strain generating part (diaphragm) 3 is elastically deformed due to the fluid pressure, its deformation will be transmitted to the strain gauge 6 through the medium of the insulating film 5 and the resistance of the strain gauge 6 will vary depending on its deformation. Thereby, the strain gauge 6 transforms the change in pressure to the change in resistance and outputs this change as an electric signal. The output of the strain gauge 6 is taken out of the pressure sensor through a bonding wire, a relay board, an input/output terminals, etc. (not shown) and sent to a predetermined control unit as the information on the pressure of the fluid.

Further, it is known in the art to constitute the sensor part 4 mentioned above by two layers of thin conductor films. For instance, as disclosed in JP 2004-45048A mentioned above, a first thin conductor film is formed on the insulating film 5 formed on the surface of the strain generating part (diaphragm) 3 of the sensor member 1 and a second thin conductor film is further formed over the first thin conductor film at a predetermined height so as to oppose to the first thin conductor film. The second thin conductor film is formed on the inner surface of a cap which is fixedly secured to the insulating film and an electrode electrically connected to the second thin conductor film is formed on the outer surface of the cap. According to this pressure sensor, the first and second thin conductor films form a capacitor. When the diaphragm deforms elastically due to the pressure of the fluid flowed into the sensor member, the insulating film formed on the diaphragm and the first thin conductor film formed thereon elastically deforms accordingly. Owing to the deformation of the first thin conductor film, the distance between the first and second thin conductor films changes and the electrostatic capacity increases or decreases accordingly. As a result, the change in pressure or load depending on the change in electrostatic capacity is outputted.

Heretofore, the pressure sensor is adapted to cope with various pressure ranges by changing the thickness of the diaphragm with the same geometry of the sensor member. Precipitation hardening stainless steel SUS 630 is preponderantly used as a material of this sensor member and the manufacture thereof is performed by the machining of the material mentioned above. However, as the thickness of the diaphragm becomes thin, the maintaining of the machining precision becomes difficult. Further, since the machining and lapping are required to finish the sensor member into a predetermined configuration, there is a problem that a processing cost becomes high.

In order to solve the above-mentioned problems, JP 2004-45048A mentioned above proposes to form the strain generating part by using an alloy of a composition which contains Zr, Ti, or Pd as a main component and is capable of producing metal glass (amorphous alloy) and forging the diaphragm part of the pressure sensor out of the alloy in the super-cooled liquid region thereof.

Since the method described in JP 2004-45048A mentioned above adopts the pressure forging process utilizing the super-cooled liquid region of an amorphous alloy, it gives such merits that the manufacturing steps may be considerably reduced as compared with the conventional manufacturing process by machining, such as cutting and grinding. In such a pressure forging process, however, since a bulk material of alloy is inserted into a concave of a metal mold, heated to a temperature in the super-cooled liquid region, and forged by pressing a molding punch in the concave, it often causes poor transfer of the inner surface. For example, wrinkles or the like occur in the inner surface of the strain generating part (back surface of the cylindrical part on the bore side) of the sensor member. Accordingly, it is required to further improve the surface smoothness of the strain generating part. Further, there is a limit to the thickness of the strain generating part which can be subjected to the pressure forging. The method incurs difficulty in controlling the forming conditions and therefore has room for further improvement in decreasing the frequency of occurrence of pores (cells) within the forged material and short molding. Particularly, the strain generating part which is an important part in the pressure sensor is required to have high dimensional accuracy and surface smoothness and further improved precision of transfer.

SUMMARY OF THE INVENTION

It is, therefore, an object of the present invention to solve the problems of the prior art mentioned above and to provide a method for the manufacture of a physical quantity detector which is capable of forming a strain generating part, which is an important part in a pressure sensor, satisfying high dimensional accuracy and high surface smoothness, without causing pores (cells) therein and short molding, and allows a physical quantity detector having excellent sensor characteristics to be manufactured with decreased machining steps at a low machining cost.

To accomplish the object mentioned above, in accordance with the present invention, there is provided a method for the manufacture of a physical quantity detector comprising a cylindrical part of which one end is closed with a strain generating part and a sensor part formed on the strain generating part, characterized in that the cylindrical part mentioned above is produced by melting an alloying material having a composition capable of yielding an amorphous alloy, injecting the resultant molten alloy into a metal mold, and cooling the molten alloy in the metal mold to confer amorphousness on the alloy.

In a preferred embodiment, the metal mold mentioned above is composed of a split mold having at least two split parts for forming a cavity, an insert core to be inserted into the mold so as to form the surface of the cavity corresponding to the surface of the strain generating part, and an insert pin to be inserted into the cavity so as to define the inner configuration of the cylindrical part mentioned above. In another preferred embodiment, the metal mold mentioned above is composed of a split mold having at least two split parts for forming a cavity and an insert pin to be inserted into the cavity so as to define the inner configuration of the cylindrical part mentioned above, wherein the cavity is formed so that the parting face of the mold corresponds to the surface of the strain generating part. In a more preferred embodiment, the surface of the cavity mentioned above corresponding to the surface of the strain generating part is formed in a flat surface.

In accordance with the method for the manufacture of a physical quantity detector according to the present invention, since the sensor member (the cylindrical part of which one end is closed with the strain generating part) is produced by a method which comprises melting an alloying material having a composition capable of yielding an amorphous alloy, injecting the resultant molten alloy into a metal mold, and cooling the molten alloy in the metal mold to confer amorphousness on the alloy, i.e. the so-called vacuum die casting process or high-pressure die casting process, it is possible to remarkably decrease the manufacturing steps. Further, the method particularly enables a strain generating part, which is an important part in the pressure sensor, satisfying high dimensional accuracy and high surface smoothness, to be manufactured with high transferability, without causing pores (cells) therein and short molding, and allows a physical quantity detector, such as a pressure sensor, having excellent sensor characteristics to be manufactured with high productivity at a relatively low cost. Accordingly, it is possible to manufacture the physical quantity detector with high accuracy even when it is a small detector such as a pressure sensor having an outer diameter of not more than 5 mm.

In accordance with the first preferred embodiment of the present invention, the metal mold mentioned above is composed of the split mold having at least two split parts for forming a cavity, the insert core to be inserted into the mold so as to form the surface of the cavity corresponding to the surface of the strain generating part, and the insert pin to be inserted into the cavity so as to define the inner configuration of the cylindrical part mentioned above. Accordingly, it is possible to manufacture the physical quantity detector having the strain generating part with excellent surface smoothness because mirror polishing of the surface of the insert core corresponding to the surface of the strain generating part may be easily done.

In accordance with the second preferred embodiment of the present invention, the metal mold mentioned above is composed of the split mold having at least two split parts for forming a cavity and the insert pin to be inserted into the cavity so as to define the inner configuration of the cylindrical part mentioned above, wherein the cavity is formed so that the parting face of the mold corresponds to the surface of the strain generating part. Accordingly, it is also possible to manufacture the physical quantity detector, such as a pressure sensor, having the strain generating part with excellent surface smoothness because mirror polishing of the surface of the mold corresponding to the surface of the strain generating part may be easily done.

Further, in accordance with the preferred embodiment in which the surface of the cavity mentioned above corresponding to the surface of the strain generating part is formed in a flat surface, it is possible to manufacture the physical quantity detector having the strain generating part which is flat and excels in surface smoothness.

BRIEF DESCRIPTION OF THE DRAWINGS

Other objects, features, and advantages of the invention will become apparent from the following description taken together with the drawings, in which.

DETAILED DESCRIPTION OF THE PREFERRED EMBODIMENTS

As described above, in accordance with the method for the manufacture of a physical quantity detector according to the present invention, a sensor member (a cylindrical part of which one end is closed with a strain generating part) is produced by a method which comprises injecting the melt of an alloying material having a composition capable of yielding an amorphous alloy into a metal mold and cooling the molten alloy in the metal mold to confer amorphousness on the alloy, i.e. the so-called vacuum die casting process or high-pressure die casting process. The metal mold mentioned above is composed of a split mold having at least two split parts for forming a cavity and an insert pin to be inserted into the cavity so as to define the inner configuration of the cylindrical part mentioned above. In accordance with the first preferred embodiment, the metal mold is further provided with an insert core to be inserted into the mold so as to form the surface of the cavity corresponding to the surface of the strain generating part. On the other hand, in accordance with the second preferred embodiment, the insert core is not used and the cavity is formed so that the parting face of the mold corresponds to the surface of the strain generating part.

Figure 1:
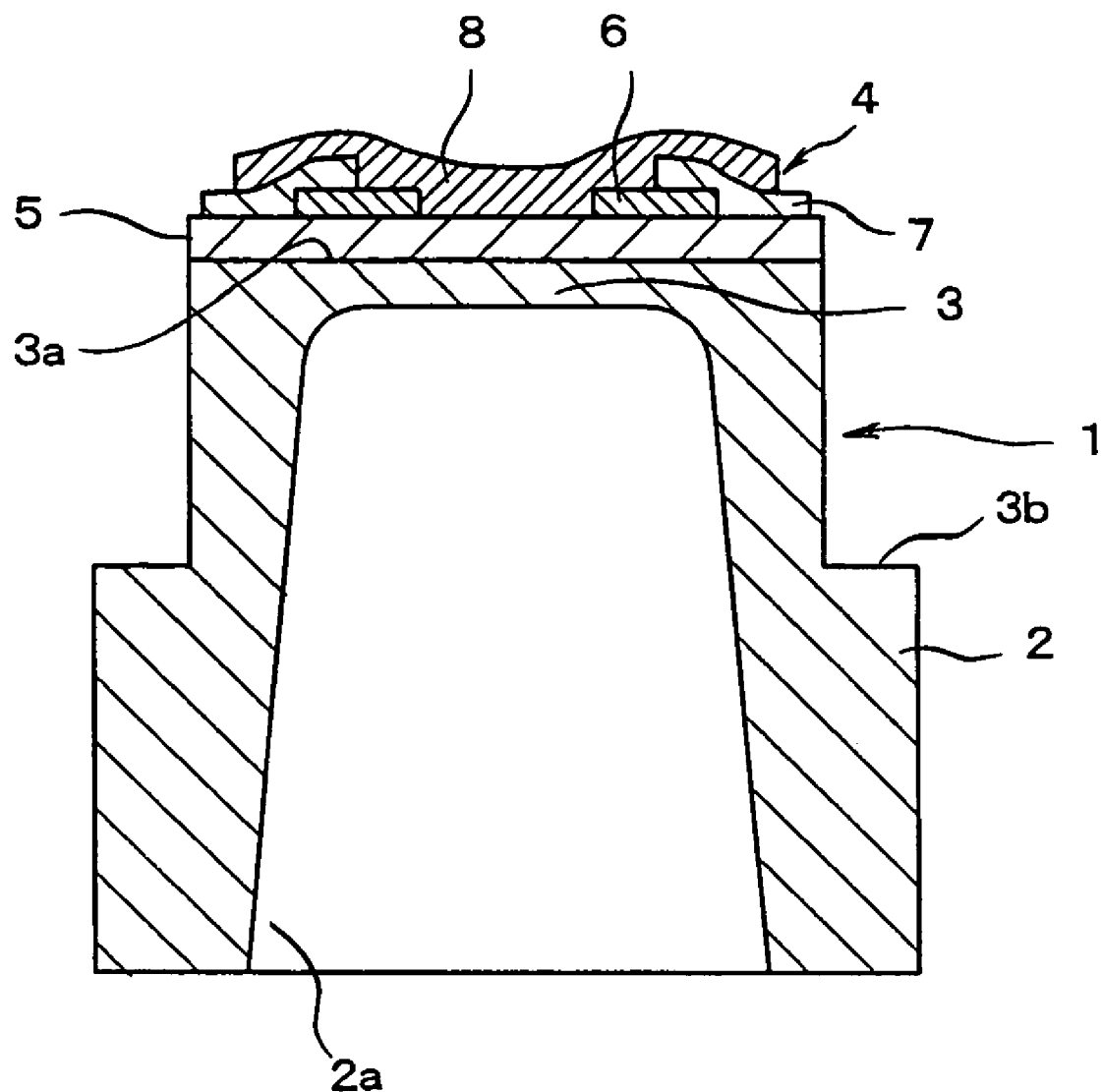
FIG. 1 is a sectional view schematically illustrating an example of a pressure sensor which is a physical quantity detector.

According to the second preferred embodiment mentioned above, since the cavity is formed so that the parting face of the metal mold corresponds to the surface of the strain generating part and thus the part of the cavity corresponding to the strain generating part will be arranged in a position near a gate, such an arrangement has an advantage that the molten alloy may be easily injected into the part of the cavity corresponding to the strain generating part having a small thickness. In the case of the pressure sensor as shown in FIG. 1, however, since the cylindrical part 2 is provided with a step portion 3b at the outer periphery, this step portion 3b needs to be post-machined in view of the extraction of the cast product from the metal mold. On the contrary, the first preferred embodiment mentioned above has an advantage that such post-machining is not required. However, since the part of the cavity corresponding to the strain generating part will be positioned apart from a gate, the injection of the molten alloy into the metal mold tends to become difficult in comparison with the second preferred embodiment. As a result, there is a possibility of causing melt wrinkles in the inner surface of the cast strain generating part. Such melt wrinkles may be eliminated by increasing the temperature of molten metal or by increasing the temperature of the metal mold or the injection speed.

In view of the injection characteristics of the molten alloy as described above, the temperature of the metal mold is desired to be set in the range of from normal temperature to 350° C., preferably in the range of 100° C. to 350° C.

The more the temperature of the metal mold becomes high, the more such defects as cells decreases when such a small product as a pressure sensor is casted. If the temperature of the metal mold is excessively low, the casting characteristics will be deteriorated because the molten alloy will be rapidly cooled when injected, and the molten alloy will be sufficiently injected into the cavity only with difficulty. Conversely, if the temperature of the metal mold exceeds 350° C., the metal mold tends to be oxidized and its durability will be deteriorated. Further, the amorphous alloy (metallic glass) tends to suffer crystallization its physical properties tend to be deteriorated.

These methods, owing to the fact that the molten alloy which is injected into the cavity is held in a pressed state due to the injection pressure, enable a sensor member (a cylindrical part of which one end is closed with a strain generating part) to be mass-produced efficiently and therefore inexpensively even when the sensor member has a thin strain generating part as in the case of a pressure sensor. Thus, the resultant sensor member faithfully reproduces the contour of cavity with high dimensional accuracy and acquires high denseness and smooth surface.

Further by carrying out the component steps of the process mentioned above in a vacuum or under an atmosphere of inert gas, the molten alloy can be prevented from producing an oxide film and the formed article of amorphous alloy can be manufactured in highly satisfactory quality. For the purpose of preventing the molten metal from producing an oxide film, it is preferable to have the apparatus in its entirety disposed in a vacuum or in an atmosphere of inert gas such as Ar gas or to sweep at least the upper part of the melting vessel exposing the molten alloy to the ambient air with a stream of inert gas.

The material for the sensor member (the cylindrical part of which one end is closed with the strain generating part) mentioned above does not need to be limited to any particular substance but may be any of the materials which are capable at all of furnishing a product formed substantially of amorphous alloy. Among other materials answering this description, the Zr-TM-Al and Hf-TM-Al (TM: transition metal) amorphous alloys represented by the following general formula and having very wide differences between the glass transition temperature (Tg) and the crystallization temperature (Tx) prove to be particularly preferable.

$$X_a M_b Al_c \qquad \text{General Formula}$$

wherein X represents either or both of the two elements, Zr and Hf, M represents at least one element selected from the group consisting of Mn, Fe, Co, Ni, and Cu, and a, b, and c represent such atomic percentages as respectively satisfy $25 \leq a \leq 85$, $5 \leq b \leq 70$, and $0 < c \leq 35$. This amorphous alloy contains an amorphous phase in a volumetric ratio of at least 50%.

These Zr-TM-Al and Hf-TM-Al amorphous alloys exhibit high strength and high corrosion resistance, possess wide super-cooled liquid ranges (glass transition ranges), .DELTA.Tx=Tx−Tg, of not less than 30 K, and extremely wide super-cooled liquid ranges of not less than 60 K in the case of the Zr-TM-Al amorphous alloys. In the above temperature ranges, these amorphous alloys manifest very satisfactory workability owing to viscous flow even at such low stress not more than some tens MPa. They are characterized by being produced easily and very stably as evidenced by the fact that they are enabled to furnish an amorphous bulk material even by a casting method using a cooling rate of the order of some tens K/s. By the metal mold casting from melt, these alloys permit very faithful reproduction of the shape and size of a molding cavity of a metal mold.

Accordingly, it is possible to produce with high productivity the sensor member which faithfully reproduces the contour of cavity with high dimensional accuracy and acquires high denseness and smooth surface. The resultant sensor has higher sensitivity as compared with that of a usual sensor because of its lower Young's modulus. Further, it may be used as a sensor for a pressure range higher than that of a usual sensor because of its higher strength.

The Zr-TM-Al and Hf-TM-Al amorphous alloys to be used in the present invention possess very large range of $\Delta Tx$, though variable with the composition of alloy and the method of determination. The $Zr_{60}Al_{15}Co_{2.5}Ni_{7.5}Cu_{15}$ alloy (Tg: 652K, Tx: 768K), for example, has such an extremely wide $\Delta Tx$ as 116 K. It also offers very satisfactory resistance to oxidation such that it is hardly oxidized even when it is heated in the air up to the high temperature of Tg. The Vickers hardness (Hv) of this alloy at temperatures from room temperature through the neighborhood of Tg is 460 (DPN), the tensile strength thereof is 1,600 MPa, and the bending strength thereof is up to 3,000 MPa. The thermal expansion coefficient, α of this alloy from room temperature through the neighborhood of Tg is as small as $1 \times 10^{-5}$/K, the Young's modulus thereof is 91 GPa, and the elastic limit thereof in a compressed state exceeds 4-5%. Further, the toughness of the alloy is high such that the Charpy impact value falls in the range of 6-7 J/cm². This alloy, while exhibiting such properties of very high strength as mentioned above, has the flow stress thereof lowered to the neighborhood of 10 MPa when it is heated up to the glass transition range thereof. Moreover, owing to the properties of the so-called glass (amorphous) substance, this alloy is characterized by allowing manufacture of formed (deformed) articles with surfaces of extremely high smoothness and having substantially no possibility of forming a step which would arise when a slip band appeared on the surface as during the deformation of a crystalline alloy.

Generally, an amorphous alloy begins to crystallize when it is heated to the glass transition range thereof and retained therein for a long time. In contrast, the aforementioned alloys which possess such a wide $\Delta Tx$ range as mentioned above enjoy a stable amorphous phase and, when kept at a temperature properly selected in the $\Delta Tx$ range, avoid producing any crystal for a duration up to about two hours. The user of these alloys, therefore, does not need to feel any anxiety about the occurrence of crystallization during the standard molding process.

The aforementioned alloys manifest these properties unreservedly during the course of transformation thereof from the molten state to the solid state. Generally, the manufacture of an amorphous alloy requires rapid cooling. In contrast, the aforementioned alloys allow easy production of a bulk material of a single amorphous phase from a melt by the cooling which is effected at a rate of about 10 K/s. The solid bulk material consequently formed also has a very smooth surface. The alloys have transferability such that even a scratch of the order of microns inflicted by the polishing work on the surface of a metal mold is faithfully reproduced.

The amorphous alloys represented by the general formula, $X_aM_bAl_c$, mentioned above manifest the same characteristics as mentioned above even when they incorporate such elements as Ti, C, B, Ge, or Bi at a ratio of not more than 5 atomic %.

Now, the present invention will be described more specifically below with reference to embodiments illustrated in the drawings annexed hereto.

Figure 2:
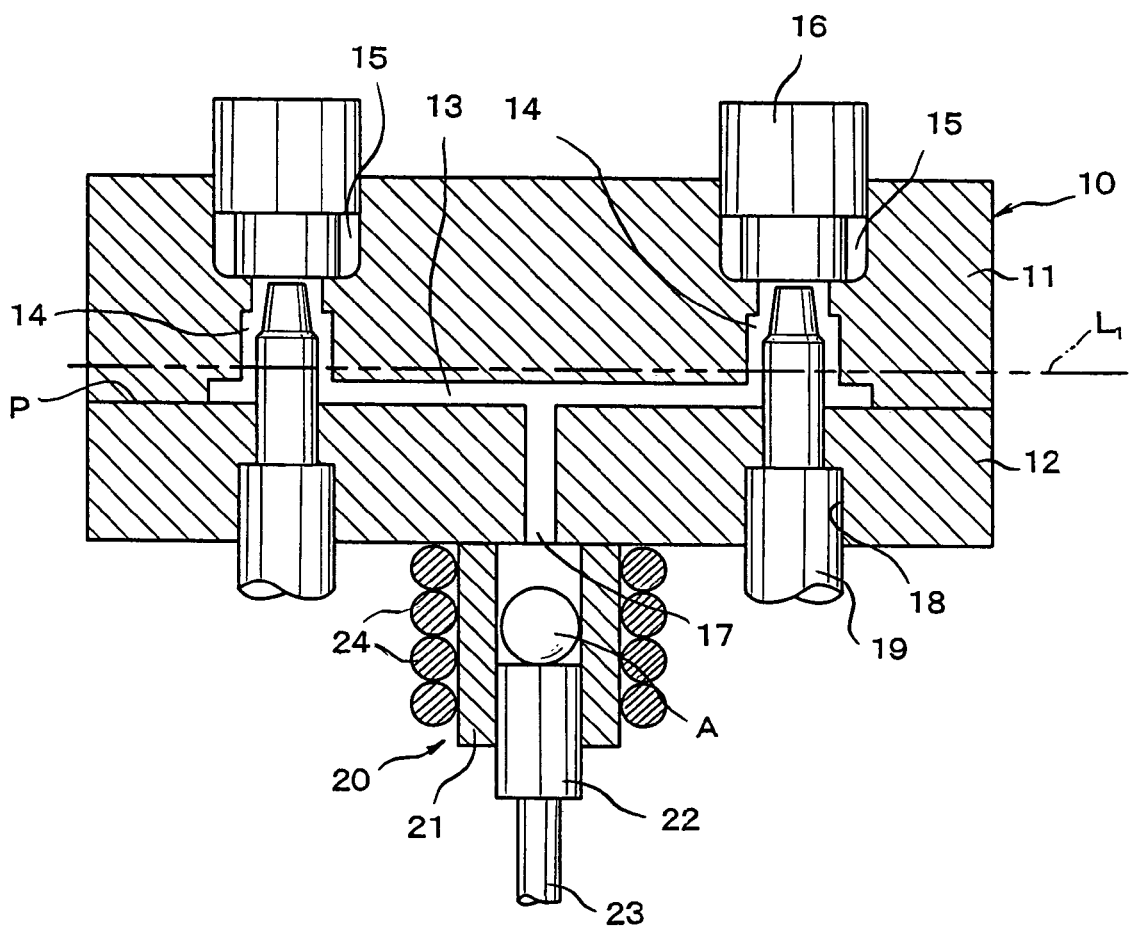
FIG. 2 is a fragmentary sectional view schematically illustrating one embodiment of an apparatus to be used in the production of a sensor member according to the present invention.

FIG. 2 schematically illustrates the construction of one embodiment of the apparatus for producing a sensor member (a cylindrical part of which one end is closed with a strain generating part) of amorphous alloy according to the method of the present invention.

A metal mold 10 is composed of an upper mold 11 and a lower mold 12. The upper mold 11 has four cavities 14 formed symmetrically therein and adapted to define the outside dimension of a cast article. These cavities 14 intercommunicate through the medium of runners 13 formed in the under surface of the upper mold 11 along the parting face P between the upper mold 11 and the lower mold 12 such that the injected molten alloy flows through the runners 13 into the cavities 14. In the upper mold 11, holes 15 are formed as extended upward from respective cavities 14. An insert core 16 is inserted into each hole 15 so that the injected molten alloy is pressed by the insert core 16 from above. Such structure is adopted to increase the sealing pressure and suppress the occurrence of fin in the direction of the leading end.

On the other hand, the lower mold 12 is provided with a sprue 17 communicating with the runners 13 mentioned above formed at a pertinent position thereof and holes 18 formed at positions corresponding to the cavities 14 mentioned above. An insert pin 19 for defining the inside dimension of a cast article is inserted into each hole 18. Incidentally, an inlet ring or sprue bush made of such insulating material as a ceramic substance or a metal of small thermal conductivity may be fitted to the sprue 17 of the lower mold 12, or the sprue 17 may be diverged downwardly to form a truncated cone space so that the molten alloy is smoothly introduced into the cavities. Alternatively, a depression which is shaped to receive the upper end of a melting vessel 20 to be described hereinafter may be formed in lower part of the sprue.

While the metal mold 10 can be made of such metallic material as copper, copper alloy, cemented carbide or super-alloy, it is preferred to be made of such material as copper alloy, for example, which has a large thermal capacity and high thermal conductivity for the purpose of heightening the cooling rate of the molten alloy injected into the cavities 14. The upper mold 11 has disposed therein such a flow channel as allow flow of a cooling medium like cooling water or cooling gas. The flow channel is omitted from the drawing by reason of limited space.

A melting vessel 20 is composed of a cylindrical raw material accommodating part 21 and a molten metal transferring member or piston 22 slidably disposed in the raw material accommodating part 21. The melting vessel 20 is disposed directly below the sprue 17 of the lower mold 12 mentioned above so as to be reciprocated vertically. The molten metal transferring member 22 has nearly the same diameter as the inner diameter of the raw material accommodating part 21 and is vertically moved by a plunger 23 of a hydraulic cylinder (or pneumatic cylinder) not shown in the diagram. An induction coil 24 as a heat source is disposed so as to encircle the raw material accommodating part 21 of the melting vessel 20. As the heat source, any arbitrary means such as one resorting to the phenomenon of resistance heating may be adopted besides the high-frequency induction heating. The material of the raw material accommodating part 21 and that of the molten metal transferring member 22 are preferred to be such heat-resistant material as ceramics or metallic materials coated with a heat-resistant film.

Incidentally, for the purpose of preventing the molten metal from forming an oxide film, it is preferable to have the apparatus in its entirety placed in a vacuum or in an atmosphere of inert gas such as Ar gas or to sweep at least the space between the lower mold 12 and the upper part of the raw material accommodating part 21 of the melting vessel 20 with a stream of inert gas.

In the production of the physical quantity detector of the present invention, for example the sensor member of a pressure sensor, first the alloying raw material A of such a composition capable of yielding an amorphous alloy as mentioned above is placed in the empty space overlying the molten metal transferring member 22 inside the raw material accommodating part 21 while the melting vessel 20 is held in a state separated downwardly from the metal mold 10. The alloying raw material A to be used may be in any of the popular forms such as rods, pellets, and minute particles.

Subsequently, the induction coil 24 is excited to heat the alloying raw material A rapidly. After the fusion of the alloying raw material A has been confirmed by detecting the temperature of the molten metal, the induction coil 24 is demagnetized and the melting vessel 20 is elevated until the upper end thereof abuts against the under surface of the lower mold 12 (the state shown in FIG. 2). Then, the hydraulic cylinder (not shown) is actuated to effect rapid elevation of the molten metal transferring member 22 and injection of the molten metal through the sprue 17 of the mold 10. The injected molten metal is advanced through the runner 13, introduced into the cavities 14, and compressed therein. At this time, the cooling rate exceeding $10^3$ K/s can be obtained by suitably setting the injection temperature, the injection speed, etc. Thereafter, the melting vessel 20 is lowered, and the upper mold 11 and the lower mold 12 are separated from each other to extract the cast article therefrom.

Figure 3:
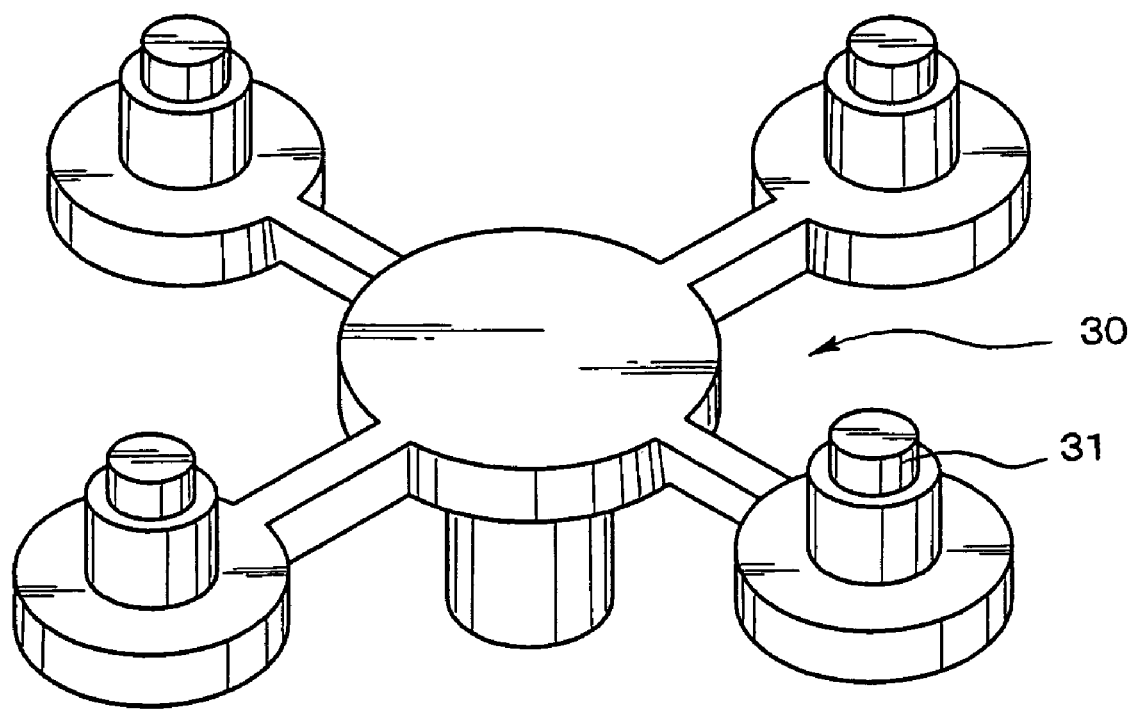
FIG. 3 is a perspective view illustrating a cast product produced by the use of the apparatus shown in FIG. 2.

The shape of the cast article produced by the method described above is illustrated in FIG. 3. Sensor members 1 (cylindrical parts 2 of which one end is closed with the strain generating part 3) as shown in FIG. 1 having a smooth surface faithfully reproducing the cavity surface of the casting mold are obtained by severing cylindrical parts 31 from a cast article 30 (the cutting line is shown in FIG. 2 with a chain double dashed line $L_1$) and trimming and grinding the cut faces of the cylindrical parts.

By adopting such die casting process, the resultant cast product may be used as an article, without polishing the surface of the strain generating part 3 shown in FIG. 1.

In the case of the apparatus shown in FIG. 2 mentioned above, the cavities 14 are formed in the upper mold 11 and the under surface of the insert core 16 is adapted to correspond to the surface of the strain generating part 3. Accordingly, it is possible to produce the article having the strain generating part with excellent surface smoothness because mirror polishing of the surface of the insert core 16 corresponding to the surface of the strain generating part may be easily done. When the cavities 14 are formed in both the upper mold 11 and the lower mold 12, however, the surface corresponding to the surface of the strain generating part 3 is the concave surface of the cavity and the mirror polishing of this surface can be done only with difficulty. Accordingly, if the above-mentioned insert core 16 is not used, it is desirable that the surface corresponding to the surface of the strain generating part be disposed on the parting face P of the upper mold 11 and the lower mold 12. An example of such arrangement will be illustrated in FIG. 4.

Figure 4:
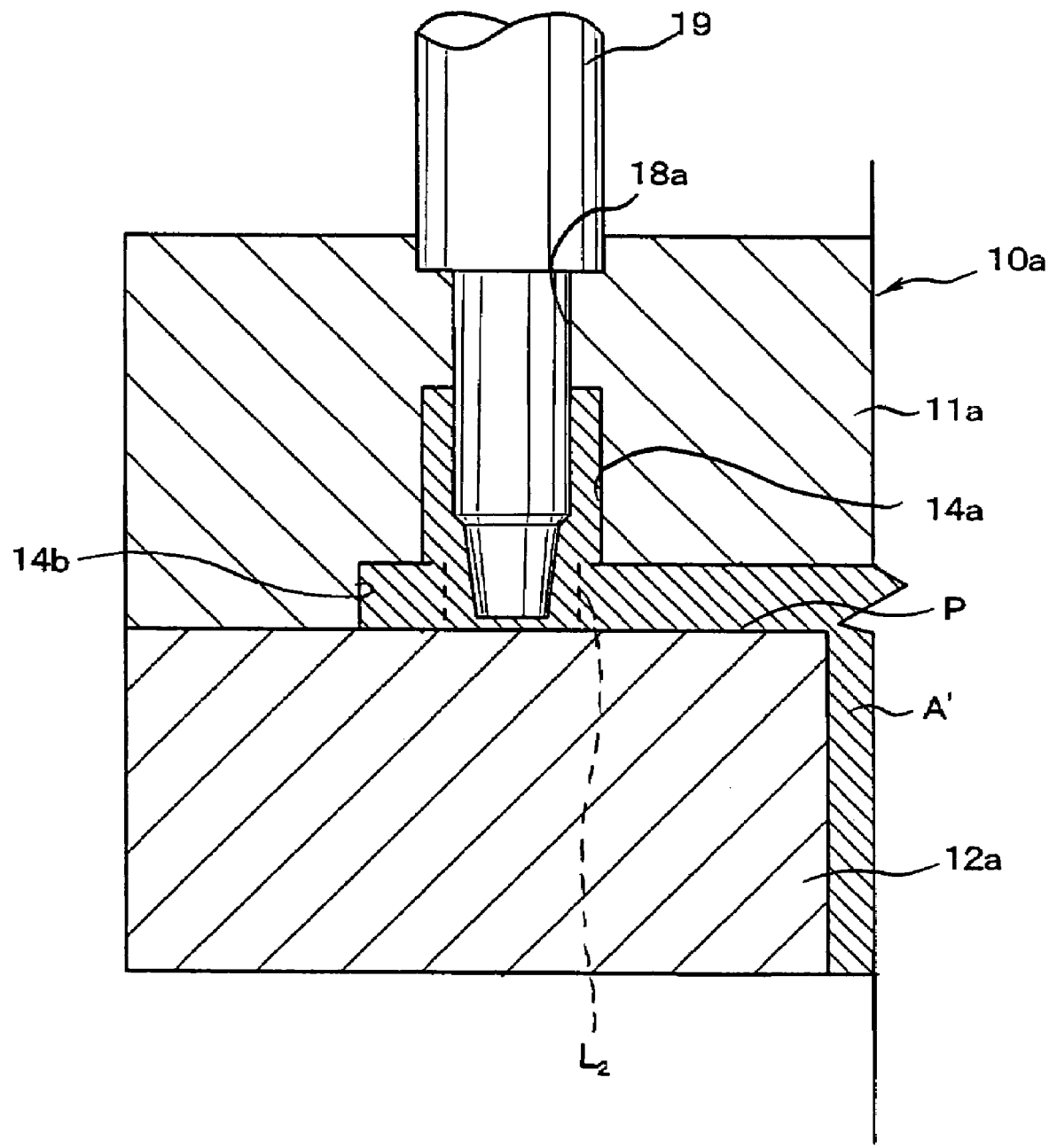
FIG. 4 is a fragmentary sectional view schematically illustrating another embodiment of an apparatus to be used in the production of a sensor member according to the present invention.

In the apparatus illustrated in FIG. 4, the metal mold 10a is different from that of the apparatus illustrated in FIG. 2 in respect that the cavities 14a formed in the upper mold 11a is so designed that the surface corresponding to the surface of the strain generating part is disposed on the parting face P of the upper mold 11a and the lower mold 12a and the insert pins 19 are inserted into the respective holes 18a formed above the cavities 14a from above. Since the other structure of the mold, the melting vessel, and the operation procedures are same as those of the apparatus illustrated in FIG. 2, their description will be omitted herein. By forming the cavities 14a in such an arrangement that the surface corresponding to the surface of the strain generating part is disposed on the parting face P of the upper mold 11a and the lower mold 12a, the mirror polishing of the flat parting face P of the lower mold 12a may be done easily. Accordingly, it is possible to produce the article having the strain generating part with excellent surface smoothness. In the case of the pressure sensor shown in FIG. 1, however, since the cylindrical part 2 is provided with a step portion 3b at the outer periphery, the cavity portion 14b corresponding to the cylindrical part should have the enlarged configuration as shown in FIG. 4 or a cylindrical configuration in view of the extraction of the cast product from the metal mold. Accordingly, the cast product obtained by injecting the molten alloy A' also into the enlarged cavity portion 14b needs to be cut along the dotted line $L_2$ shown in FIG. 4 and its step portion 3b should be post-machined.

On the surface 3a of the strain generating part (diaphragm) 3 of the cylindrical part 2 as the sensor member 1 produced as described above, an insulating film 5, a strain gauge 6 formed from the thin film of a metal or semi-conductor, electrodes 7, a protective coat 8, etc. are superposed in the same manner as the conventional manufacturing process described hereinbefore to prepare the pressure sensor shown in FIG. 1. Incidentally, although the diaphragm produced according to the method of the present invention may be used as it is in the transfer-molded state, the outer surface of the strain generating part may be subjected to polishing for the purpose of increasing the accuracy of surface smoothness, as occasion demands.

Now, the present invention will be described more concretely below with reference to some test examples which have confirmed the effect of the present invention specifically.

<Preparation of Samples>

By the use of the apparatus as shown in FIG. 2, an alloy ingot of $Zr_{55}Al_{10}Ni_5Cu_{30}$ prepared by melting the raw materials in advance was melted thoroughly by high-frequency induction heating at a temperature range of 1100° C. to 1300° C. in a vacuum of $1 \times 10^{-4}$ Torr. The melt was injected into the cavities 14 of the metal mold 10 and rapidly cooled at the cooling rate of not less than 100° C./sec. Then, the cast product was removed from the mold, the runner parts were severed from a cast article 30 shown in FIG. 3 (at a position of the chain double dashed line shown in FIG. 2), and the trimming of the cut faces and grinding of the end faces of the cylindrical parts were performed. After the washing step and the drying step, the sensor members 1 as shown in FIG. 1 were obtained (outermost diameter: 5 mm or less).

Five sensor members prepared as described above were subjected to the following evaluation tests.

Structural Examination:

The structural analysis on the surface of the strain generating part of a sample (sensor member) was performed by the X-ray diffraction method using the XRD equipment (XRD-6100) manufactured by Shimadzu Corp. As a result, it had been confirmed that all samples were amorphous alloys.

Concentricity Evaluation Test (Difference Between the Outer Diameter and the Inner Diameter):

By the use of SmartScope ZIP 250S type manufactured by Optical Gaging Products Inc., the sample was irradiated with light from above. The shape of the sample was measured from the aggregate of edges of the shadow of the sample projected on the upper detector, and the deviation of the concentricity of the outer diameter and the inner diameter of the cylindrical part was measured.

Evaluation Test of Thickness of Strain Generating Part:

By the use of Digimatic Indicator ID-F125 manufactured by MITUTOYO Corp., the sample was placed on a platen, and the distance from the platen to the upper end of the sample was measured by setting the surface of the platen at a zero point.

Surface Roughness Test:

By the use of the surface roughness measuring device, SURFCOM 1400D manufactured by Tokyo Seimitsu Co., Ltd., the surface roughness of the surface of the strain generating part was measured by putting a gauge head on the outside surface of the strain generating part and moving it thereon.

The results of the above-mentioned tests are shown in the following Table.

TABLE

| Sample No. | Thickness of Strain Generating Part [mm] | Surface Roughness [Ra] | Concentricity [mm] |
|---|---|---|---|
| 1 | 0.2 or less | 0.2 | 0.015 |
| 2 | 0.2 or less | 0.2 | 0.012 |
| 3 | 0.2 or less | 0.2 | 0.012 |
| 4 | 0.2 or less | 0.2 | 0.01 |
| 5 | 0.2 or less | 0.2 | 0.012 |

As being clear from the results shown in the above Table, it was possible to make the thickness of the strain generating part very thin so as to be not more than 0.2 mm (thereby, the improvement in sensitivity is expectable). Further, in all samples the surface of the strain generating part had very high smoothness, which was very advantageous in attaching a strain gauge thereto.

While certain specific embodiments have been disclosed herein, the invention may be embodied in other specific forms without departing from the spirit or essential characteristics thereof. The described embodiments are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

The disclosure in Japanese Patent Application No. 2006-16093 of Jan. 25, 2006 is incorporated here by reference. This Japanese Patent Application describes the invention described hereinabove and claimed in the claims appended hereinbelow and provides the basis for a claim of priority for the instant invention under 35 U.S.C. 119.

What is claimed is:

1. A method for the manufacture of a physical quantity detector comprising a cylindrical part of which one end is closed with a strain generating part and a sensor part formed on the strain generating part, characterized in that said cylindrical part is produced by melting an alloying material having a composition capable of yielding an amorphous alloy, injecting the resultant molten alloy into a metal mold, and cooling the molten alloy in the metal mold to confer amorphousness on the alloy, wherein said metal mold comprises a split mold having at least two split parts for forming a cavity, an insert core to be inserted into the mold so as to form a surface of the cavity corresponding to an outside surface of the strain generating part, and an insert pin to be inserted into the cavity so as to define the inner configuration of said cylindrical part, and wherein the surface of said cavity corresponding to the outside surface of the strain generating part is formed in a flat surface by a surface of said insert core having a surface area larger than a surface area of the outside surface of said strain generating part.

2. The method set forth in claim 1, wherein said metal mold has a temperature set in the range of from 100° C. to 350° C.

3. A method for the manufacture of a physical quantity detector comprising a cylindrical part of which one end is closed with a strain generating part and a sensor part formed on the strain generating part, characterized in that said cylindrical part is produced by melting an alloying material having a composition capable of yielding an amorphous alloy, injecting the resultant molten alloy into a metal mold, and cooling the molten alloy in the metal mold to confer amorphousness on the alloy wherein said metal mold is composed of a split mold having at least two split parts for forming a cavity and an insert pin to be inserted into the cavity so as to define the inner configuration of said cylindrical part, wherein the cavity is formed so that a parting face of the mold corresponds to an outside surface of the strain generating part, and wherein the surface of said cavity corresponding to the outside surface of the strain generating part is formed in a flat surface by said parting face of the mold having a surface area larger than a surface area of the outside surface of said strain generating part.

4. The method set forth in claim 3, wherein said metal mold has a temperature set in the range of from 100° C. to 350° C.

* * * * *